June 8, 1965
C. H. KOONZ ETAL
3,188,212
HANDLING OF POULTRY
Filed June 12, 1961
3 Sheets-Sheet 1
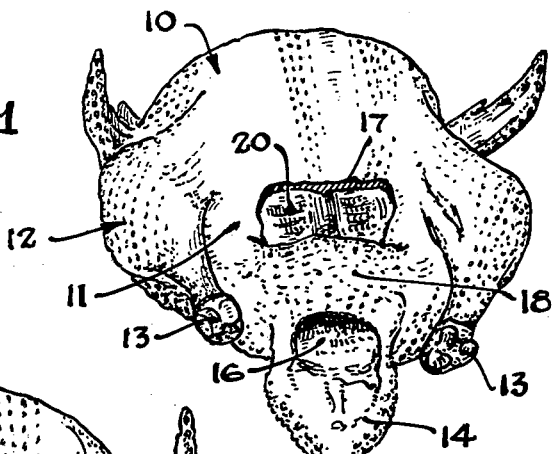
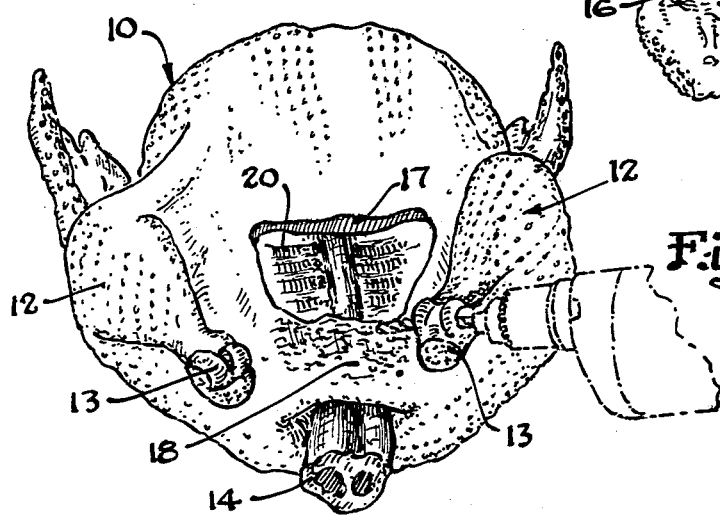
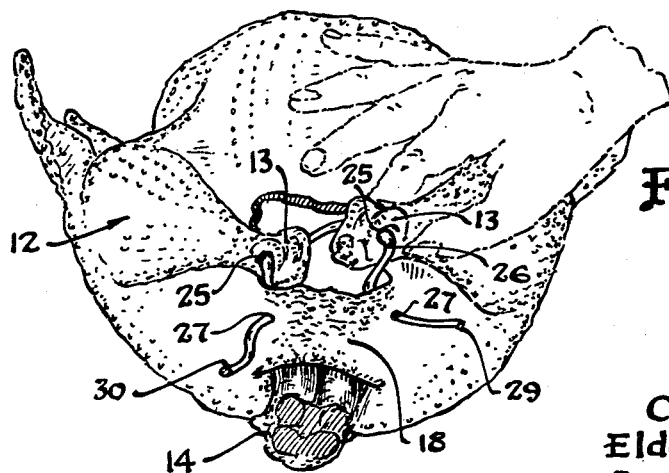
Inventors
Carl H. Koonz
Eldon J. Strandine
Irvin R. Lentz
By R. G. Story
Attorney

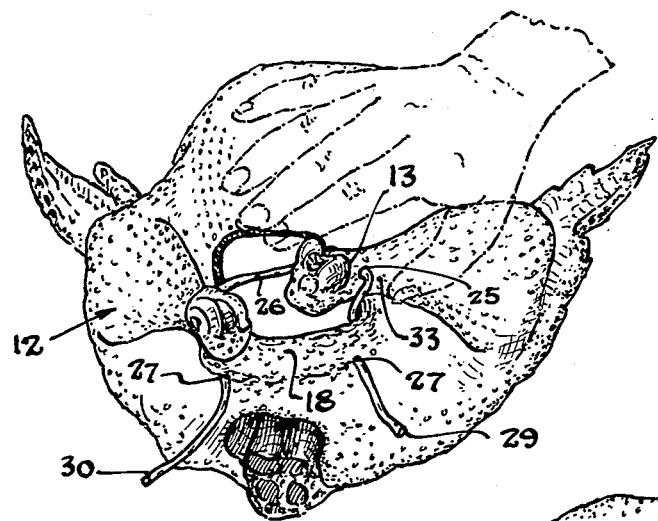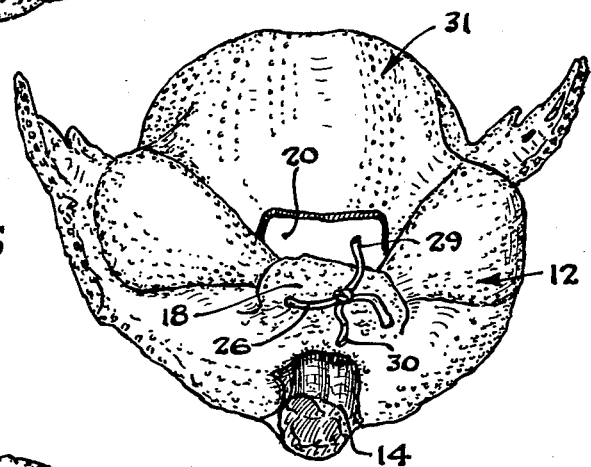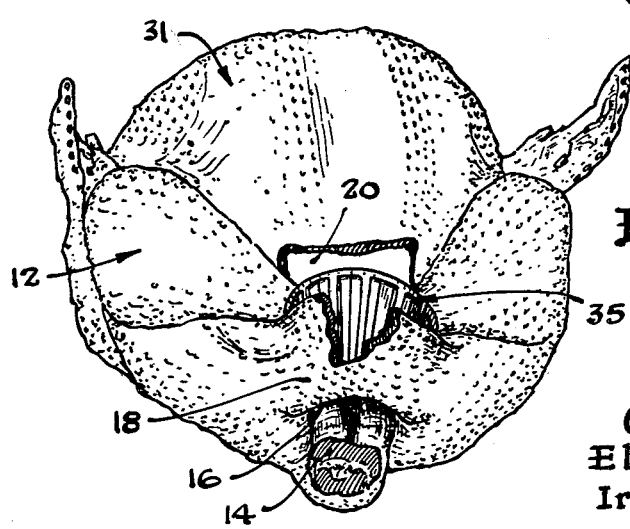

Inventors
Carl H. Koonz
Eldon J. Strandine
Irvin R. Lentz
By R. G. Story
Attorney

United States Patent Office 3,188,212
Patented June 8, 1965

3,188,212
HANDLING OF POULTRY
Carl H. Koonz, Downers Grove, and Eldon J. Strandine and Irvin R. Lentz, Chicago, Ill., assignors to Swift & Company, Chicago, Ill., a corporation of Illinois
Filed June 12, 1961, Ser. No. 116,435
3 Claims. (Cl. 99—107)

The present invention relates in general to poultry products. More specifically our invention is directed to a method of trussing poultry and to the poultry so obtained.

In conventional poultry processing, the birds are dispatched, defeathered, eviscerated, and chilled. The birds may also be thoroughly cleaned, have the necks removed and have the foot, or shank, of the leg disjointed to expose the hocks. After these poultry dressing operations, many birds, especially chickens, are sold fresh and iced without wrapping. Other poultry, notably turkeys, ducks, geese, etc., are wrapped in tight-fitting, relatively transparent, wrappers such as heat-shrinkable films, polyethylene film, etc., and are then frozen.

The irregular contour of the poultry makes it difficult to place a wrapper tightly about the bird without the danger of rupturing the package, e. g., by a hock joint piercing the wrapper. The irregularity in surface further makes it difficult to efficiently pack a number of birds, wrapped or unwrapped, in a shipping container. Additionally, the irregularly shaped packages do not present an attractive product to the potential customer. It is, therefore, readily apparent that poultry products of a more regular contour and methods for preparing such products are in demand.

Evening or smoothing out the normal irregularities in the shape of the bird, for example the legs, is a difficult problem which has been partially solved by attempts to shorten the over-all length of the bird and to get the legs to conform to the rounded shape of the body of the bird. Some of the conventional poultry trussing operations involve tying or wrapping the ends of the legs together, or tucking the ends of the legs into the posterior end of the abdominal cavity under a fold of abdominal skin. Rubber bands extending from the uropygium to the breast have also been used to draw in the legs and shorten the bird. Another common practice in the industry, especially in the handling of turkey, is to use a bar cut in opening the posterior end of the body cavity of the bird to enable the operator to remove the viscera, including gizzard, liver and heart. This bar cut consists of a large horizontal incision at a point just dorsal to the posterior end of the keel bone. A second opening must be made to free the vent from the adjacent edible tissues. The legs or hock joints can then be held firmly in place by the intact strip of tissue (several inches in width) which lies between the vent opening and the horizontal cut. When this conventional bar cut is used when trussing large birds, e.g. those over about 10 pounds, automatic removal of the leg portions from under the strip of tissue is substantially precluded.

While steps in the right direction, the aforementioned trussing operations are lacking in some respects. While perhaps the best of the present day methods, the conventional bar cut has the disadvantage of requiring a strip of tissue of sufficient width that the horizontal cut will open up the area where the skin leaves the abdominal muscles and goes around the leg. In these areas the skin is liable to tear easily and underlying tissues are exposed. If the cut were restricted to the region where the skin is firmly attached to the abdominal muscles the band of tissue formed would be relatively small, and it would be difficult to truss birds, especially those under ten pounds, because the legs will not be firmly seated under the band.

It is a principal object and advantage of our invention to overcome the drawbacks of the conventional trussing methods.

A further object of our invention is to provide an attractive poultry product which is trussed to provide a more regular contour.

An additional object of the invention is to provide a trussed bird wherein the skin posterior to the leg has not been cut and thus does not expose the thigh musculature and adjacent tissue.

Still another object of the invention is to provide a method for handling birds wherein the legs thereof are so manipulated that they more nearly conform to the shape of the carcass.

A further object of the invention is to provide a method for placing poultry in a shape amenable to more uniform packaging.

Other objects and advantages will be apparent to those skilled in the art from the following description of the inventon taken in conjunction with the drawings, in which:

FIGURE 1 illustrates a dressed carcass prior to trussing.

FIGURES 2 and 3 show the sequential steps involved in one embodiment of our trussing operation, while FIGURE 4 shows a variation of the operation shown in FIGURES 2 and 3. FIGURE 5 illustrates the finished product of the embodiment of FIGURES 2-4.

FIGURE 6 illustrates the finished product of an additional embodiment of our trussing operation.

Figure 7:
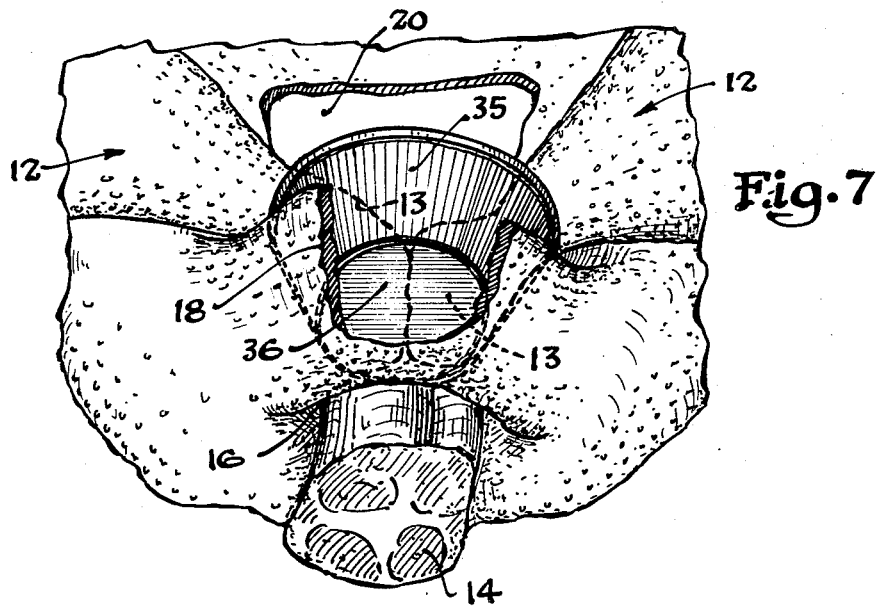
FIGURE 7 is an enlarged view, partially in section, of the leg securing means of the embodiment of FIGURE 6.
Figure 8:
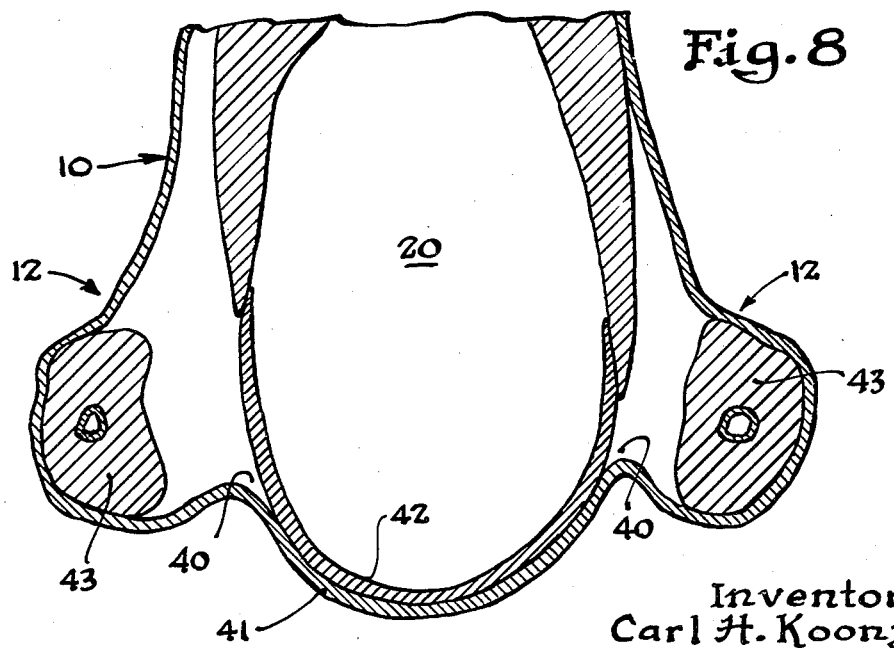
FIGURE 8 is a diagrammatic illustration of a transverse cut through the lower body portion of a bird with the legs extended laterally.

In preparing the trussed bird of our invention the bird is first dispatched and defeathered. The shanks and feet of the bird are removed and the head and a portion of the neck cut off. A circular incision is made around the anal opening of the bird to free the vent. Any conventional means for performing this cut may be used, such as an operator manually performing the operation or by an automatic vent freeing machine. The lower backbone of the bird may be cut to disengage the tail from the spinal column to give the tail flexibility so that it can be later folded back into the abdominal cavity of the bird through the vent cut. The bird is then placed on its back and a generally horizontal incision with respect to the length of the bird made through the abdominal wall of the bird between the vent opening and the keel bone or sternum. The horizontal cut is so spaced posteriorly between the keel bone and the vent cut that the lateral extension of the cut does not extend beyond the points where the skin separates from the ventral abdominal musculature to pass around the thigh (see FIGURE 8). While the positioning and length of the generally horizontal or transverse cut will vary somewhat depending upon the size of the bird, it should generally be made at a point approximately 1–1½ inches anterior and ventral of the circular vent opening and should extend about 1½–2 inches on each side of the median line on the posterior anterior axis. The viscera are removed through the incision and preferably the inside of the bird is thoroughly cleaned.

After the foregoing operations have been performed, the bird will appear substantially as illustrated in FIGURE 1 which shows the carcass generally 10 including abdomen 11, leg portions or thighs generally 12, hock joints 13 and tail 14 having the vent freed to provide generally circular orifice 16 and having a generally transverse cut 17 in abdomen 11 forming with orifice 16 a strip of abdominal wall tissue 18.

Due to the positioning and length of transverse cut 17, strip 18 will generally not hold leg portions 12 placed thereunder in position during chilling and subsequent handling. However, we have found that portions of the legs 12 and the hock joints 13 can be seated under strip 18 and secured in a manner to prevent spontaneous removal from under said strip. In this manner we achieve the desirable results of producing an attractive trussed bird of substantially regular contour which bird can be similarly retrussed by the homemaker after stuffing, etc., thereby avoiding additional steps to keep the dressing contained in the bird during the roasting or cooking operation. We thus prepare a bird which provides tremendous consumer convenience yet we substantially completely overcome the undesirable result of opening the area 40 posterior to the leg, where the skin 41 separates from the abdominal wall 42, and thus exposes the thigh musculature 43.

With respect to securing the leg portions in a manner to prevent spontaneous removal from under strip 18, one embodiment of our invention involves securing the lower portions of the legs 12 and/or hocks 13 together wtih a holding means such as a cord or string, passing both ends of the cords through the tissue of strip 18 so as to pass from underneath the trip out through the outer side thereof, preferably at points spaced from one another about 1½", and pulling taut and fastening the ends of the cord on the outer side of strip 18. In this manner, we substantially simultaneously achieve (1) insertion of portions of legs 12 into the abdominal cavity 20 and under strip 18 through the incision 17 and (2) obtention of firmly secured leg portions under said strip. One aspect of this embodiment is shown in FIGURES 2, 3 and 5 with a variation illustrated in FIGURE 4.

Referring to FIGURES 2 and 3, a hole, or orifice, 25 is made in the lower bony part of the leg portion 12 near or through joint 13. More specifically, orifice 25 is preferably drilled in a transverse direction through the lower expanded end of each leg (tibiotarsus) from the lateral to the mesial surface making a passageway through said leg. Cord 26 is inserted through orifice 25 in each of leg portions 12. The ends of cord 26 are passed through strip 18 as at points 27 in such a manner that the free ends 29 and 30 of cord 26 will be on the outer or top side of strip 18. Clearly cord 26 could first be passed through one point 27 on strip 18 from the outer to the underneath surface thereof, the cord then passed through orifices 25 of legs 12 and thence through the other point 27 on strip 18 from the underneath to the outer surface thereof to achieve the same result. Cord ends 29 and 30 are then pulled to effect insertion of leg portions 12 into abdominal cavity 20 and under strip 18. The cords ends are then fastened together as, for example, by tying (see FIGURE 5) which forms the trussed bird generally 31. Clearly, many means of fastening cord ends 29 and 30, other than tying, can be used. For example, a small tag of metal, plastic, cardboard, etc., with a circular fastener thereon such as a button, can be attached to one cord end and the other cord end fastened around the tag after the cord has been drawn up taut.

Another version of the holding cord method of securing the leg portions is shown in FIGURE 4. Here cord 26 is passed through the skin and/or tissue 33 of the lower drumstick rather than through holes drilled in the bone. The other steps toward forming trussed bird 31 are generally as stated hereinbefore.

Cord 26 can be string (cotton, nylon, plastic, etc.) wire, coated threads or the like, can be of various cross-sectional shapes or relatively flat, and can be fastened in the fashion most expedient for the type of cord used, e.g., a wire might be twisted together rather than knotted.

Another embodiment of our invention relating to the aspect of securing a part of the leg portions 12 within the abdominal cavity 20 and under strip 18 in a manner to prevent automatic removal from under the strip 18 is illustrated in FIGURE 6. In this embodiment an insert generally 35, having a base or bottom end 36 of a size sufficiently large so that insert 35 will not be extruded through circular orifice 16 is placed into the body cavity 20 of carcass 10 through the transverse cut 17. Bottom end 36 of insert 35 is directed toward the posterior part of carcass 10. Bottom end 36 contacts strip 18 and is firmly seated thereunder. Insert 35 has a hock-holding area, such as a generally U-shaped configuration, to hold or anchor the two legs of carcass 10. To obtain secure holding of the legs within cavity 20, the hock joints 13 contact the U-shaped area of insert 35 and are firmly held within the insert.

Insert 35 may be in the form of a cup or other shaped article having a generally U-shaped area for receiving and holding the hocks and lower portions of the legs 12. The insert may be of plastic, cardboard, etc. Particularly if a shaped piece of plastic is used as an insert, it may be desirable that tooth-like protuberances be provided on the outside of the insert to aid in gripping the tissues of the carcass to firmly seat insert 35 in position under strip 18. We have found a U-shaped cup having a base about 1½ inches in diameter with a diameter of about 2 inches at the top of the cup to be eminently suited for holding the legs in the manner shown in FIGURE 6.

The trussed carcasses illustrated in FIGURES 5 and 6 are in good form to be chilled. The birds can then be placed in bags or otherwise wrapped if desired.

Obviously many modifications and variations of the invention as hereinbefore set forth may be made without departing from the spirit and scope thereof, and therefore only such limitations should be imposed as are indicated in the appended claims.

We claim:

1. The method of trussing a poultry carcass having a substantially continuous perimeter and having the vent freed to leave a generally circular orifice around said vent which comprises: making a generally transverse, with respect to the length of said carcass, incision into the abdominal cavity of said carcass, said incision being spaced anteriorly and ventrally from said generally circular orifice to form a strip of abdominal wall tissue between said incision and said circular orifice, said strip being of a size insufficient to prevent automatic removal of portions of the legs of said carcasses subsequently positioned thereunder; removing viscera from said carcass; placing an insert under said strip through said incision, said insert being of a size sufficient to preclude extrusion thereof through said orifice, said insert including a hock-holding area; and inserting the hocks of said carcass into said hock-holding area of said insert whereby portions of the legs of said carcass are firmly held under said strip.

2. In the method of trussing a poultry carcass wherein a strip of abdominal wall tissue is formed between the keel bone and a generally circular orifice around the vent area under which strip portions of the legs of the carcass are to be placed, the improvement comprising: securing the lower portions of the legs of said carcass together with a holding cord having two free ends, passing the free ends of said cord through said strip, pulling said free ends taut whereby said portions of the legs of said carcass will be inserted into the abdominal cavity of said carcass and seated under said strip, and fastening said free ends together whereby said portions of said legs will be firmly secured under said strip.

3. In the method of trussing a poultry carcass wherein a strip of abdominal wall tissue is formed between a horizontal slit posterior of the keel bone and a generally circular orifice around the vent area under which strip portions of the legs of the carcass are to be placed, the improvement comprising: placing an insert through said slit and firmly seating said insert under said strip in contact therewith, said insert being of a size sufficient to preclude extrusion thereof through said circular orifice, said insert including a hock-holding area, and inserting the hocks of said carcass through said slit into said hock-holding area of said insert whereby portions of the legs of said carcass are firmly held under said strip.

References Cited by the Examiner

UNITED STATES PATENTS 1,980,904  11/34  Botz _____ 99—107 X
2,842,443  7/58   Rice et al. _____ 99—107

A. LOUIS MONACELL, *Primary Examiner.*

HYMAN LORD, *Examiner.*